(12) United States Patent
Krejsa (10) Patent No.: US 6,925,546 B2
(45) Date of Patent: Aug. 2, 2005

(54) MEMORY POOL CONFIGURATION SYSTEM

(75) Inventor: Dan Krejsa, Alameda, CA (US)

(73) Assignee: Wind River Systems, Inc., Alameda, CA (US)

( * ) Notice: Subject to any disclaimer, the term of this patent is extended or adjusted under 35 U.S.C. 154(b) by 314 days.

(21) Appl. No.: 10/307,840

(22) Filed: Dec. 2, 2002

(65) Prior Publication Data

US 2004/0107329 A1 Jun. 3, 2004

(51) Int. Cl.[7] .............................................. G06F 12/00
(52) U.S. Cl. ...................... 711/173; 711/171; 711/129; 711/144; 711/145; 711/153; 711/156
(58) Field of Search ................................. 711/118, 173, 711/170, 129, 144, 145, 152, 153, 156, 163

(56) References Cited

U.S. PATENT DOCUMENTS 5,961,621 A * 10/1999 Wu et al. .................... 710/107
6,625,684 B1 * 9/2003 Casey et al. ................. 710/316

\* cited by examiner

*Primary Examiner*—Jack A. Lane
(74) *Attorney, Agent, or Firm*—Fay Kaplun & Marcin, LLP (57) ABSTRACT

A memory partitioning system for memory of an embedded or auxiliary processor is described. Memory regions with different attributes are formed, having specified cacheability and visibility characteristics. A configurable table describes the memory regions required by the software running on the auxiliary processor.

18 Claims, 5 Drawing Sheets

MEMORY POOL CONFIGURATION SYSTEM

BACKGROUND INFORMATION

In many modern computing applications a computer's central processing unit (CPU) is expected to carry out multiple tasks simultaneously. For example, in addition to the basic requirement of performing the operations required to execute user applications, the CPU is also required to carry out operations to support various services associated with peripherals, input/output operations, and network traffic. As the network operations, peripherals etc. become more capable, the amount of computing required to support them also increases, often placing great strain on the CPU. One example of service that requires a large amount of computing power is the TCP/IP communications protocols used to transport data across networks. TCP/IP processing consumes a large portion of the computing that the CPU must do to support network traffic.

One method used to ease the amount of computing the CPU must perform is to install dedicated processing systems ("processors") that are used to take up some of the functions originally carried out by the CPU, which is referred to here as the host CPU. These accessory processors, or daughter processors, may be part of the same basic computer as the host CPU, or may be located on an external peripheral, a removable card, or on a device remote from the CPU. Frequently these accessory processors perform work related to the input/output operations of the peripheral devices which would otherwise be directly controlled by the host CPU, in which case such auxiliary processor may be called an I/O processor (IOP). In the case of TCP/IP processing, the accessory processor may be incorporated on a network interface card which in turn is connected to the host CPU via data buses. A similar arrangement is often carried out with video accelerator cards which contain dedicated accessory processors, with SCSI controllers such as those used to control hard disk drives, and with RAID controllers. When these arrangements are carried out, the host CPU is freed from having to execute all the functions necessary to operate the accessories or the network connections, and can devote more uninterrupted time to applications, in effect resulting in a higher processing speed available to applications.

Accessories that include a daughter processor typically also include memory for use by the daughter processor. Generally this memory takes the form of dynamic RAM (random access memory). At least a portion of that memory should be accessible by the host CPU, to facilitate communication between host CPU and daughter processor. However, other regions of the memory need not be accessed by the host CPU. A flexible scheme is thus needed to optimally partition the available RAM memory into appropriately sized regions with the desired attributes. Present schemes lack this flexibility, and sacrifice either performance or require mapping excessive memory to the host CPU.

SUMMARY OF THE INVENTION

In one exemplary embodiment, the present invention is a memory configuration system for an auxiliary processor having an internal bus and connectable to an external system via at least one external bus, The system comprises a memory configuration table including a plurality of entries, each of the plurality of entries corresponding to one of a plurality of regions of auxiliary processor memory and including at least one location field, at least one size field, and at least one visibility field. The system also includes a module configured to partition the auxiliary processor memory into the plurality of regions, including assigning values to the at least one location field, at least one size field, and at least one visibility field, wherein the at least one visibility field includes a field indicating visibility of the corresponding region by at least one of the internal bus and the at least one external bus.

In another aspect, the invention is a method of partitioning a memory of an auxiliary processor, which includes the steps of constructing a memory configuration table configured to contain size and visibility attributes of a plurality of memory regions, the visibility attributes corresponding to accessibility of each of the plurality of memory regions via at least one bus of a plurality of buses. The steps also include computing a range of memory addresses accessible over the at least one bus for caching the plurality of memory regions, and setting registers of the auxiliary processor to map memory according to the size, visibility attributes and range of memory addresses for each of the plurality of memory regions.

DETAILED DESCRIPTION

The present invention may be further understood with reference to the following description of preferred exemplary embodiments and the related appended drawings, wherein like elements are provided with the same reference numerals. Although embodiments of the present invention are herein described with reference to a host CPU connected to a single auxiliary CPU controlling a network and a SCSI interface, those of skill in the art will understand that different configurations with different processors and accessories may be employed while remaining within the scope of the invention.

The effective speed of a computer system is often negatively affected by various tasks that the system's CPU has to carry out, extraneous to the primary task of executing the applications requested by the user. Some of these extraneous tasks are associated with various input and output (I/O) operations, such as controlling a modem, implementing a network connection, accessing a hard disk drive, or controlling a video display. These operations may be very computing-intensive, and result in a noticeable slowing of the system's performance every time that a task is suspended to tend to the control of the accessory, such as by having to execute an interrupt service routine. In particular, processing performed by the CPU in support of TCP/IP communication protocols is very resource intensive, and forms a large part of the processing required for many systems.

Several methods to accelerate the effective speed of a computing system may be used, including network accelerators that remove some of the functions of the primary CPU and transfer them to a daughter, or auxiliary CPU. The primary CPU, also referred to as the host CPU, is thus freed from those tasks, and can more efficiently allocate resources to the execution of user applications. The accelerator platform used to free the host CPU from many of the most computationally intensive I/O tasks is an auxiliary or daughter processor which is optimized to carry out the I/O functions, or other types of functions that were formerly carried out by the host CPU. In this context, the daughter processor may include any type of auxiliary CPU that is capable of carrying out instructions for a task. The auxiliary processor may be embedded in a device connected to the host system, may be part of an expansion card such as a video card, network interface card, drive controller card, or may even be connected to the same mother-board as the host CPU. In addition to the auxiliary CPU, the accelerator platform may include memory, buses, interfaces and software that will be described below.

Software to "offload" some of the host CPU's functions to the daughter CPU must be present and running both on the host system and on the auxiliary processor, so that some processes that normally would be assigned to the host CPU for execution are intercepted by the software and are offloaded to the auxiliary processor instead. The software may bypass the native processes of a host operating system executing on the host CPU, such as the native TCP/IP processing taking place on the host CPU, and move that processing to the embedded daughter processor, such as an intelligent NIC (iNIC).

Figure 1:
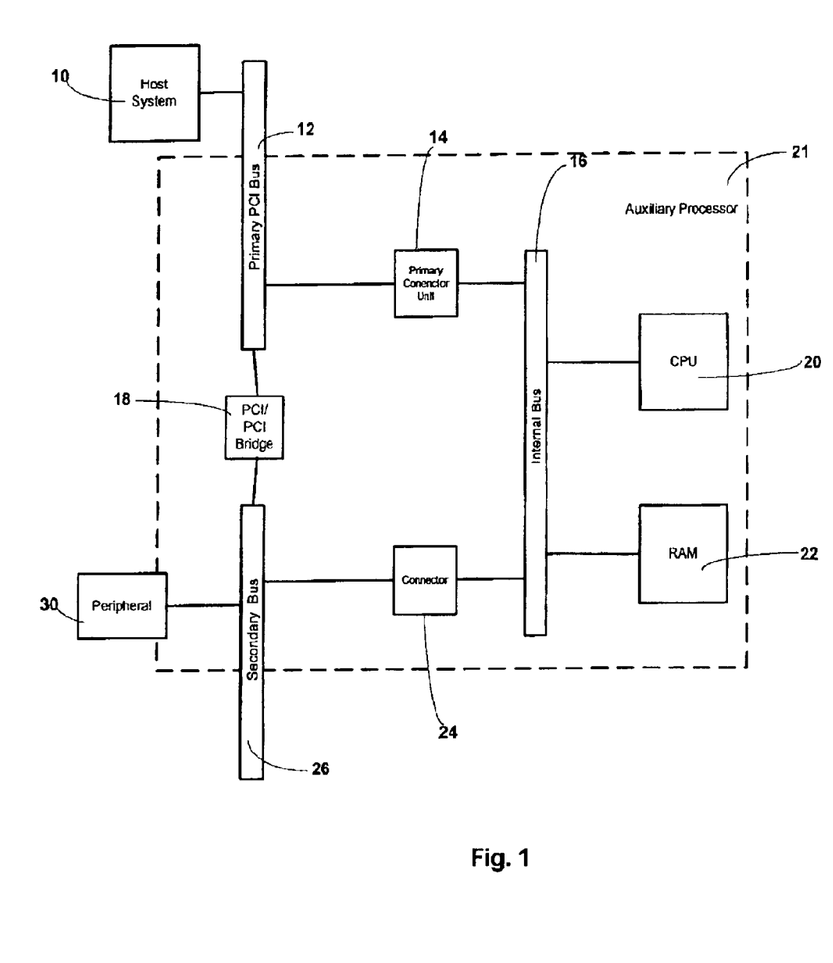
FIG. 1 is a diagram showing an exemplary connection between a host and an auxiliary processor, according to an embodiment of the present invention.

FIG. 1 shows a diagram of an exemplary connection between a host processor and a daughter processor. In this exemplary embodiment, Peripheral Component Interconnect (PCI) buses are used to form the connection. PCI is generally used within a computer to transfer data between the computer's CPU and various peripherals such as hard disk controllers, video adapters, network cards etc. In the context of the preferred embodiment of the present invention, the PCI buses perform the same function, and convey data to the daughter processors of the various peripherals. In the system shown, box 10 corresponds to the host system which is connected via PCI bus 12 to an auxiliary processor 21, shown by the dashed line. In this exemplary embodiment, the auxiliary processor may be an intelligent NIC or intelligent SCSI (iSCSI) initiator card, but additional types of auxiliary processors may be similarly configured, such as a RAID controller. The auxiliary processor may be a plug-in adapter, or may be built onto the host system's motherboard. The choice of PCI as the interconnect between the host system 10 and the auxiliary processor 21 is not essential to the invention. If an interconnect is provided that is capable of communication over great physical distances, the auxiliary processor 21 may be remote from the host system 10.

As shown in FIG. 1, auxiliary processor 21 internally may contain a PCI/PCI bridge 18 connecting primary PCI bus 12 to secondary auxiliary processor bus 26. Units 14 and 24 connect PCI bus segments 12 and 26 respectively to the auxiliary processor internal bus 16. These units are concerned with facilitating data transfer between the PCI bus segments and the internal bus, and each typically consists of an address translation unit (ATU) in conjunction with one or more DMA channels. The primary unit 14 typically also contains a messaging unit speeding message traffic between the host 10 and the auxiliary processor 21. In some implementations, unit 14 is absent. In this case data or messages from host system 10 must traverse PCI/PCI bridge 18 and unit 24 to reach auxiliary processor internal bus 16. In these implementations, a message unit may be part of unit 24.

Auxiliary processor internal bus 16 connects directly to an auxiliary processor CPU 20 and to the memory controller for RAM 22, which is the auxiliary processor memory. Auxiliary CPU 20 may be executing an operating system and one or more applications to perform the offload processing aspects of auxiliary processor 21. Portions of RAM 22 may need to be mapped to regions of PCI memory space visible to the CPU of host 10, for example, in order that host 10 may write request messages to message frames in auxiliary processor RAM 22. Typically bulk data transfer between the memory of host 10 and auxiliary processor RAM 22 is accomplished by means of DMA engines in unit 14, to avoid burdening either the CPU of host 10 or auxiliary processor CPU 20 with this work. Since the CPU of host 10 does not master these bulk data transfers, it does not need to access the regions of auxiliary processor RAM 22 containing the source or destination buffers of such transfers, but only the regions containing the request message frames, which is typically a small fraction of the total auxiliary processor RAM 22.

In this exemplary embodiment, the purpose of the auxiliary processor 21 is to perform work related to network communication offloaded from the CPU of host computer system 10. Part of this work includes direct control of the hardware network interface, which may be provided by peripheral 30, which may be an integral part of the auxiliary processor, or may be an expansion card plugged therein. While it is possible for host 10 to control peripheral 30 directly through PCI/PCI bridge 18, in this embodiment the network interface is hidden from the host by the PCI/PCI bridge, and is controlled instead by the auxiliary processor CPU 20. It is still possible for peripheral 30 to access data buffers from PCI-mapped RAM of host system 10 directly through bridge 18, but it is also necessary and desirable for peripheral 30 to access data and descriptors in auxiliary processor RAM 22. Both the control of peripheral 30 by auxiliary processor CPU 20 and the access to RAM 22 by peripheral 30 are enabled by ATU 24, which maps portions of PCI memory space containing the registers of peripheral 30 into the internal bus 16 address space, and maps at least part of the internal bus 16 address space corresponding to RAM 22 into PCI address space accessible to devices on secondary PCI bus 26, such as peripheral 30.

As indicated above, RAM 22 is the principal memory used by daughter CPU 20 when carrying out its offloaded computing functions. However, for certain I/O tasks, host computer 10 also must be able to access at least portions of RAM 22. Some scheme for dividing RAM 22 into regions visible to one or both processors must be devised, so that an optimal performance for the system may be attained. RAM 22 thus should be divided into regions that have different visibility with respect to the host system 10 and auxiliary processor CPU 20, and to the various peripherals connected thereto. Generally, all of RAM 22 is visible to daughter CPU 20, but different regions of RAM 22 may be given different visibilities relative to the host system 10 and the various peripherals. In addition, it may be advantageous to set the characteristics of these memory regions, for example by defining them as cacheable, uncacheable, or with special purpose attributes.

A conventional method for the operating system of an auxiliary processor to configure RAM 22 into regions of different visibility and cacheability attributes consists of applying a fixed rule which is not tailored to the specific needs of an application. For example, the operating system may always divide RAM 22 in half, with one half being visible to only auxiliary processor CPU 20, and the other half being mapped so that it is visible to both primary PCI bus 12 and to secondary PCI bus 26. In this case, the second half of auxiliary processor RAM 22 may be accessible by both the host system 10 and by the devices connected to secondary bus 26, such as peripheral 30. Since the first half of RAM 22 is private to auxiliary processor CPU 20, it is typically also made cacheable, for best performance. The second half of RAM 22 may be made non-cacheable to support all drivers, including the drivers which do not manage cache coherence explicitly.

Such a simple fixed rule for configuring memory regions will function adequately in many cases, although performance will not be optimized. However, in many instances this simple approach causes a number of problems. In one case, if the size of auxiliary processor RAM 22 is large, the BIOS or operating system of host 10 may not be able to allocate a sufficiently large PCI window to cover all of the second half of auxiliary processor RAM 22, which may cause operation to fail. In fact, often the amount of memory which needs to be accessible to the CPU of host system 10 is much smaller than the amount which must be visible to the devices connected to secondary PCI bus 26. In another case, using optimized device drivers and OS code which manages cache coherency manually, performance may be improved if some buffers accessible to either the host system 10 or peripheral 30 are made cacheable. This is particularly true if these buffers are also made accessible by auxiliary processor CPU 20. In a different approach, a particular architecture of auxiliary processor CPU 20 may provide several variant types of cacheable memory, and applications may wish to allocate buffers of more than one of these different types of memory for different purposes. In any of these cases, an application may be able to bypass the default RAM partition choices made by the operating system of auxiliary processor 21 on an ad-hoc basis, but the procedure for doing so is typically neither systematic nor well-documented. Further, it is possible to let the operating system itself incorporate assumptions depending upon the default simple fixed memory configuration rule implicitly into its own code. This can make modifying the default configuration problematic.

Figure 2:
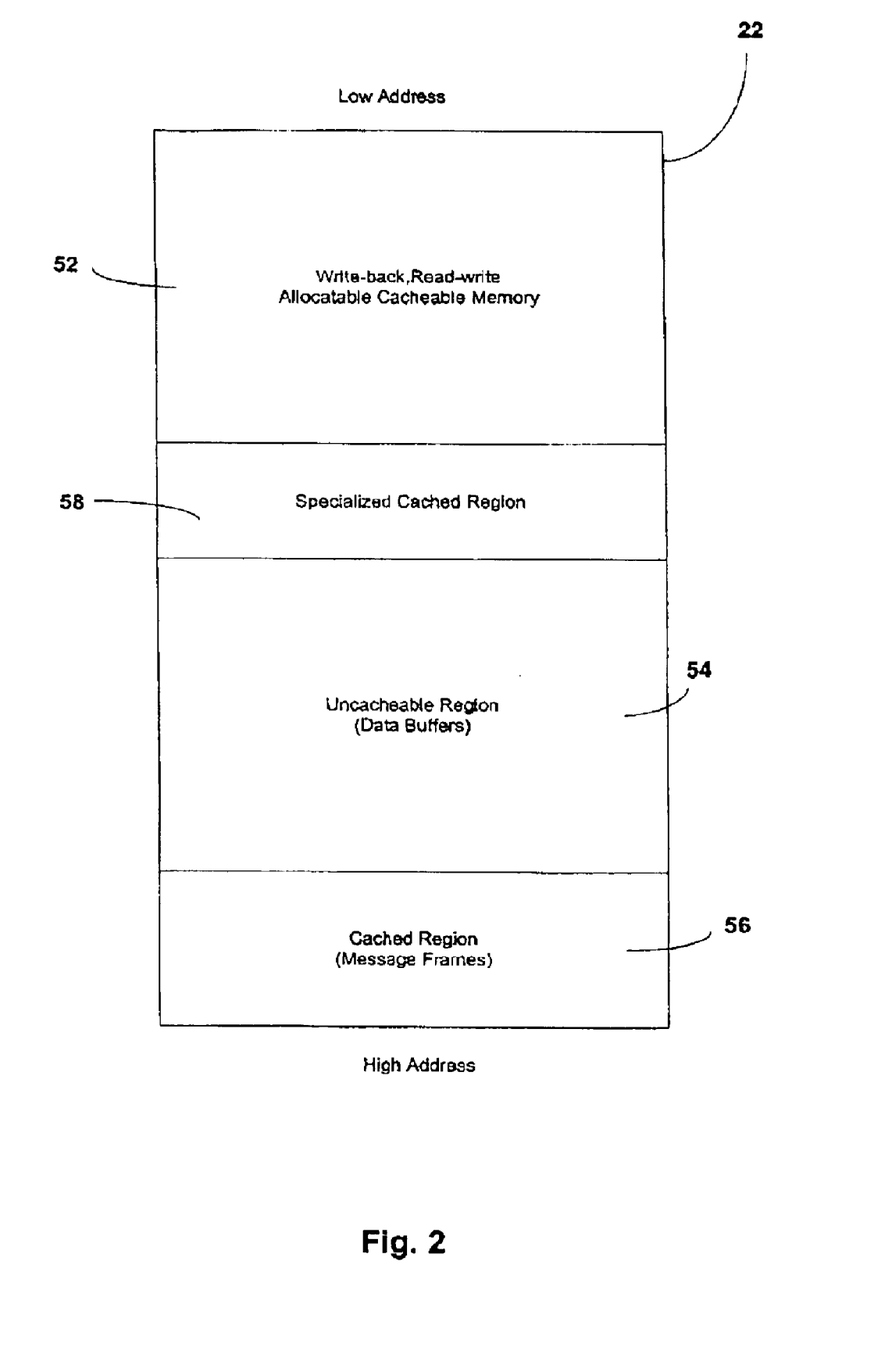
FIG. 2 is a diagram showing an exemplary partition of RAM memory according to an embodiment of the invention.

The embodiments of the memory configuration system according to the present invention provide greater flexibility in adding or removing memory regions or pools, and in configuring the size and characteristics of existing memory regions. In this manner the RAM 22 of the auxiliary processor 21 may be configured for optimum performance easily and in a systematic way. FIG. 2 shows an exemplary embodiment of a RAM partition which may be obtained according to the present invention. In this exemplary configuration, RAM 22 is divided into different regions that can be given different cacheability and visibility attributes as follows. Region 52 consists of write-back, read-write allocate cacheable memory, and contains all operating system and application code segments (e.g. machine instructions for auxiliary processor CPU 20) as well as the main general use system memory pool. Region 54 is uncacheable, and contains data buffers whose contents are not usually touched by auxiliary processor CPU 20. These buffers are accessed by peripheral 30 and by the DMA channels of unit 14. Region 58 may be a small, specialized cached region used for particular purposes, such as receive and transmit descriptors for peripheral 30. Region 56 is a cached region containing message frames in which host 10 writes request messages across the PCI bus. Only region 56 is made visible via the primary PCI bus 12, while all of the regions are visible in a hidden PCI interval behind PCI/PCI bridge 18 via internal PCI bus 16.

According to the present invention, the allocation of RAM 22 described above is not fixed, or hard-coded, but rather is assigned according to a memory configuration table which may be accessed and modified by a user or a system administrator before the system startup is completed. By using this system, which will be described in greater detail below, the memory configuration may be modified if, for example, additional RAM becomes available, or if there is a change in requirements for memory to drive the peripheral accessories connected to the secondary bus 26. The memory configuration table may be used by the system during start up of the processors, to initially set the size and attributes of RAM 22 based on the configuration described in the table. The memory configuration table may include minimum ranges of memory addresses which are allocated various functions and various properties, and/or formulas to compute the amount of memory of different characteristics to be allocated.

In one exemplary embodiment, the present memory configuration system is implemented by a software module with a set of software utilities that provide an extension to the initialization and memory partition libraries of the auxiliary processor's native operating system. With respect to cacheability of memory regions, various drivers and applications require memory of different cacheability attributes, taken from different memory regions. Within cacheable memory further attributes may be defined, such as write-through, copy-back, read-allocate or read-write allocate, and in some configurations snooping may be supported. These attributes may be specified using the memory configuration table according to the invention. In one example, the software utilities may rely on existing Memory Management Unit (MMU) initialization tables to describe the desired cacheability attributes of different regions of RAM 22, without having to introduce additional means of description.

Figure 4:
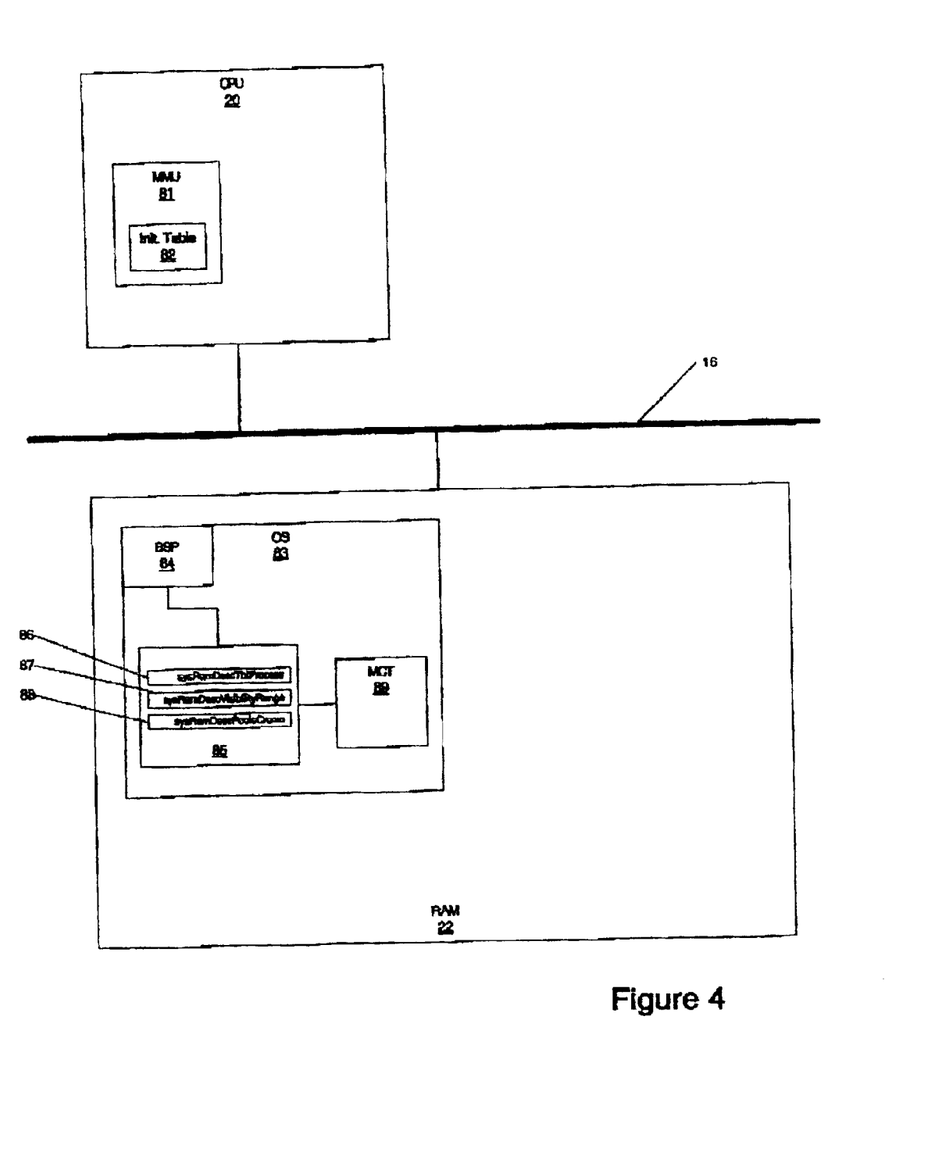
FIG. 4 shows additional detail of an exemplary system according to the present invention.

FIG. 4 shows additional detail of the exemplary system according to the present invention. As shown, auxiliary CPU 20 is connected to internal PCI bus 16, which is further connected to RAM 22. CPU 20 includes MMU 81 for managing memory on auxiliary processor 21, which further includes an initialization table 82 to initialize the parameters by the MMU 81 for memory access (e.g. cache attributes). RAM 22 includes an operating system 83 executing on the CPU 20. Operating system 83 in the preferred embodiment is the IxWorks™ operating system available from Wind River Systems, although other operating systems could be implemented. Operating system 83 may be highly modular, particularly with respect to the type of CPU 20 and associated hardware used in auxiliary processor 21. Hardware-specific features of operating system 83 may be contained in a special section of the code, for example a board support package (BSP) 84. BSP 84 contains the initialization routines and the drivers for all the hardware peripherals used by the system, such as serial, Ethernet, timer and SCSI peripherals, etc. The present memory configuration system software package takes advantage of the drivers present in the BSP to process the MMU cache attributes for the memory regions, by converting them to standard memory access caching attribute values.

With respect to the visibility of memory regions, the accessibility by the host system 10 and the various hardware agents of the system may be determined by which buses are allowed to access which regions of the RAM 22. Various regions, such as those handling thread stacks and communication with peripherals, may be kept invisible from the host system 10. This may be achieved, for example, by configuring the ATU 14 so that it responds to PCI transactions in a PCI address window and completes the transactions on the internal bus 16 in a mapped address window corresponding to a given region of RAM 22. Other regions, such as those handling message frames from the host, may be visible to host system 10 via primary bus 12. Additional memory regions may be made visible to adapters like network data buffers and device DMA descriptors, by making them visible to secondary bus 24. The present software modules describe the visibility of regions of RAM 22 to the various buses by means of a bit map. A simple two bit visibility descriptor may be used to define the visibility of a region of RAM 22 to primary and secondary buses 12, 26, but additional visibility bits may be included in an expanded model. As was the case when describing the cache attributes of memory regions, the description of visibility attributes may be converted to native visibility values of the auxiliary processor by using BSP routines.

In one exemplary embodiment, the memory configuration system according to the present invention is provided as an API module (e.g. module 85 of FIG. 4). API module 85 is divided in three principal facilities. The primary facility 86 (referred to as sysRamDescTblProcess) is invoked from the initialization routines of the operating system of the auxiliary processor, and is used to validate and initialize the memory configuration table 89 by allocating RAM space to the table. Arguments passed to this facility may include the address and length of an array describing different memory regions, and the start and end addresses of the memory range from which to carve the regions. The passed arguments may also include a flag or boolean indicator to determine whether to set the addresses and sizes of the referenced entries in the MMU initialization table 82 which was described above. The start/end range of memory typically corresponds to the entire available RAM, and the end address may be determined by dynamic RAM sizing conducted earlier in the startup sequence. Memory configuration table 89 may be located within operating system 83, as shown in FIG. 4, or outside of operating system 83, as desired.

Figure 5:
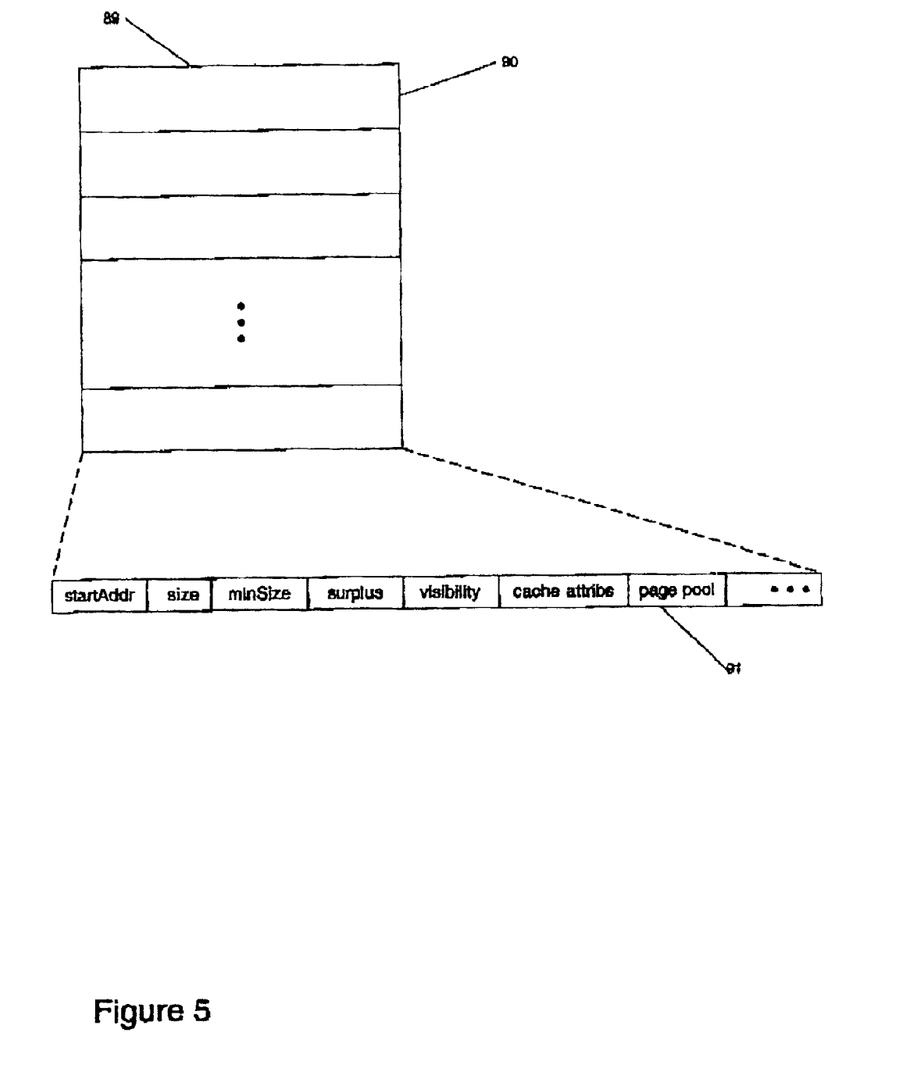
FIG. 5 shows a more detailed view of a memory configuration table according to the present invention.

FIG. 5 shows a more detailed view of memory configuration table 89. Each entry 90 of the memory configuration table is a structure 91 which describes a single contiguous memory region of uniform characteristics. Some fields of the entry structure must be initialized before calling the SysRamDescTblProcess facility. For example, the visibility of the memory region from the various buses attached to the Input/Output processor (i.e. auxiliary processor 21) is described by a visibility field of the entry. In the exemplary embodiment, this field is a bitmap that may contain any combination of the two bit values PRI_PCI and SEC_PCI, referring to visibility from the primary bus 12 and from secondary bus 16, respectively. Cache attributes of the memory region are also indicated in a field of the entry 90. In this embodiment, the cache attributes are specified by reference to an entry in the MMU initialization table 82 defining those attributes in an architecture-specific way.

Each entry 90 of the memory configuration table passed to the sysRamDescTblProcess facility may also contain a minSize field specifying the minimum size for the corresponding region. The minSize parameter may be set to zero, if the corresponding memory element can be dispensed with. The sum of all minSize values for the entries in the table must not exceed the size of the range of memory available for use. The memory range start and ending values, as well as the minSize parameters should be multiples of a granularity value specifying the smallest unit of memory that can be allocated to a particular region. This granularity may be imposed by hardware restrictions or performance requirements.

In cases where the sum of all minimum values specified for the subdivision regions of RAM 22 is less than the range size, the sysRamDescTblProcess facility may be configured to add additional memory space to the defined regions. This feature determines which regions are allowed to grow, and at what rate, if unallocated RAM remains. For example, a surplus parameter may be specified for all regions, to indicate to the system whether available additional memory should be added to that region or not. The magnitude of the surplus parameter may further be used to indicate how much of the additional memory should be added, for example by making the amount of added memory proportional to the value of surplus. A maximum individual or cumulative value for the surplus parameter may also be specified.

A special field in the memory configuration table entry 90 for a memory region may specify whether a memory page pool should be created on top of that region. The memory page pool may be generated according to a flag or parameter for the region which may be turned on or off to determine the status of the page pool. A page pool enables allocation from a portion of memory having uniform visibility and attributes, which is formed from a memory region possessing those specified characteristics. If a page pool is created from one of the regions, additional parameters may be defined to provide information specific to the page pool. For example, the battery back up character of the pool, the offset from the start of the region at which the pool should start, and the number of pages in the pool reserved for operating system routines may be specified.

When the memory space within the specified range of RAM 22 is divided up by facility sysRamDescTblProcess 86, the memory assigned to each region will be a continuous block with starting address and length given by the specific elements of the entry 90 (i.e. startAddr, size). Earlier entries in the array are assigned memory blocks with lower starting and ending addresses. In this preferred embodiment, according to the invention, the blocks are non overlapping, and will use the entire available range of RAM addresses that are passed to sysRamDescTblProcess. In the exemplary embodiment, more than one entry in the table 89 may refer to the same MMU initialization table 82 entry. In that case, all the table entries 90 specified by the sysRamDescTblProcess facility which have the same index in the MMU initialization table 82 must be consecutive in the table. A parameter may be provided to the facility to request updating the map of the MMU initialization table, such that for each of the consecutive sequence of entries the corresponding MMU initialization table entry's virtual address, physical address and length are set to those of the combined block covering the regions of that sequence.

According to embodiments of the invention, executing the memory allocation facility sysRamDescTblProcess processes the entries of the memory allocation table, and in each entry stores the allocated start address and the size of the corresponding memory region. The facility reports either successful completion or an error, and also carries out transformations to convert the BSP-specific cache and visibility attributes to a standard format useable by the auxiliary processor's operating system 83. When the appropriate parameters are included in invoking the facility, the calculated start addresses and sizes of the regions are used to initialize the start addresses and sizes of corresponding entries in the MMU initialization table. The results generated by the sysRamDescTblProcess facility may be used by BSP code or by code specific to the IOP (i.e. daughter CPU 20) when programming the window registers used by ATU units 14, 24, as well as other hardware registers which determine or depend on RAM mapping.

The memory configuration system according to embodiments of the present invention may also include a second facility 87 to calculate the memory range visible to a bus. The facility is used to compute the smallest range covering all regions specified by a completed memory configuration table which have a specified visibility attribute. Two requirements must be met for describing memory windows or regions in the PCI system. These are that the windows have a size equal to a power of two, and that the starting or "base" address of each window be a multiple of the size, in other words that it must be aligned on a power of two boundary equal to its size. The sysRamDescVisibilityRange facility 87 can expand the minimum range covering the regions with the specified visibility to a window which meets the two PCI requirements described above, while still encompassing the relevant regions.

The sysRamDescVisibilityRange facility 87 computes the start addresses and length based on the entries in the memory configuration table 89. The visibility bitmap generated during initialization is used to determine which buses are allowed to view the memory regions associated with the start addresses and lengths of the memory regions generated by sysRamDescVisibilityRange. An error is returned by this r facility if the minimal covering interval computed is empty. In that case, the start and length addresses for the memory regions are not written in the output of this second facility. Since the second facility 87 uses as input the memory configuration table 89 initialized by the first facility sysRamDescTblProcess 86, it should only be called after the initialization has been performed.

A third facility 88 may complete the full memory configuration system according to embodiments of the present invention. This facility, which may be referred to as the sysRamDescPoolsCreate facility 88, creates page pools on top of the memory regions determined by sysRamDescTblProcess in the memory configuration table 89. The sysRamDescPoolsCreate facility 88 walks through the entries 90 of the memory configuration table after sysRamDescTblProcess has run. For each entry 90 that has the pool creation indicator set and that also corresponds to a region of nonzero size, the routine creates a page pool (a memory allocation pool) on top of that memory region. Other parameters needed by the auxiliary processor operating system 83 for the creation of such page pools may be specified in the memory configuration table entry 90.

Figure 3:
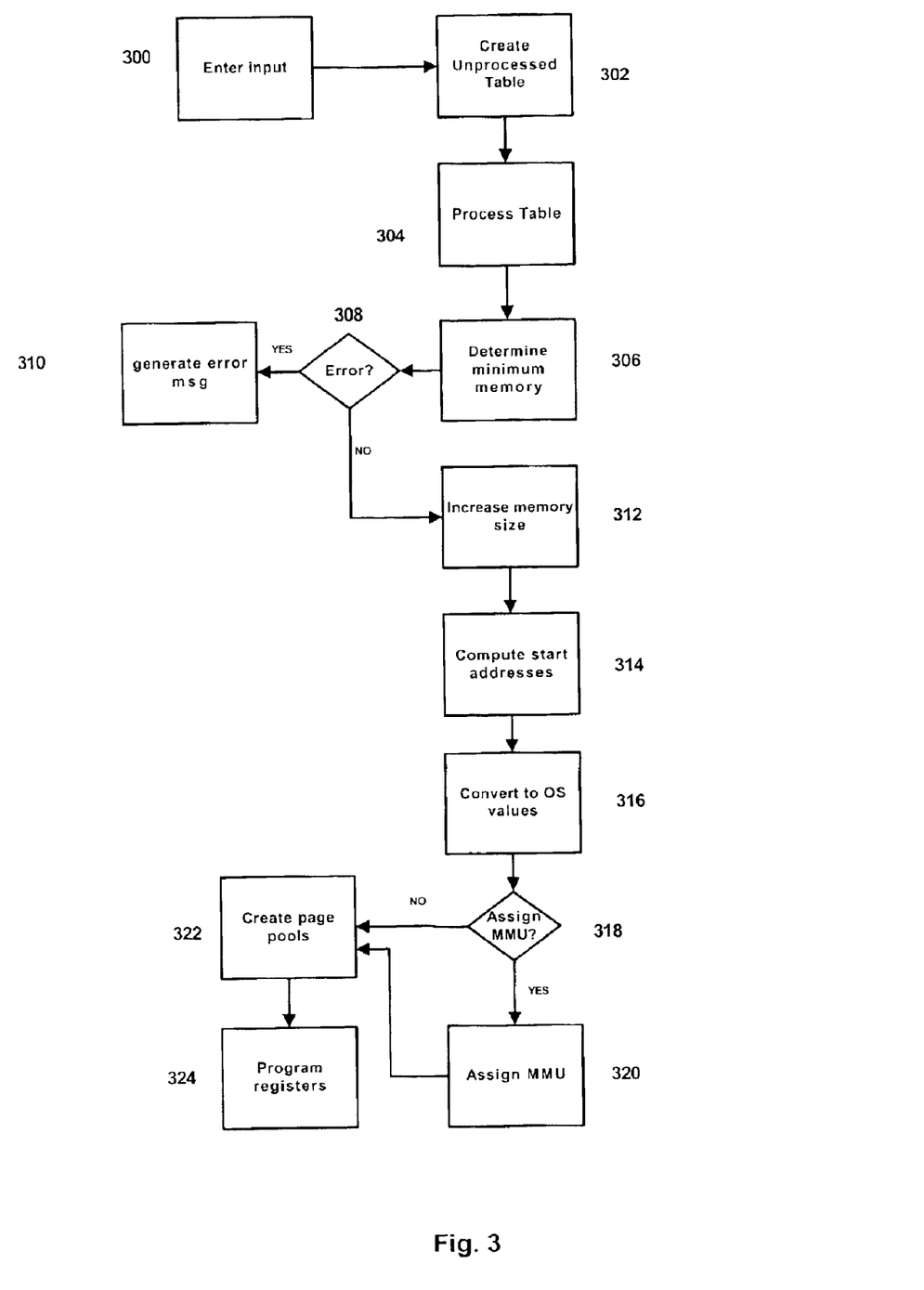
FIG. 3 is a flow chart showing steps to allocate memory regions according to an embodiment of the invention.

FIG. 3 shows exemplary steps that may be taken to configure a memory of a daughter processor 21 according to embodiments of the present invention. Initial step 300 consists of entering as input the region size, region growth factors, visibility, cacheability and other memory attributes that the developer wants to include in the partitioning of RAM 22. Any suitable conventional method of entering data for use by the modules of the system may be used to enter the appropriate memory configuration information. An unprocessed memory configuration table 89 for auxiliary processor's RAM 22 is thus generated in step 302 from the inputs provided by the developer. The memory configuration table 89 is in a format that can be used by the various facilities of the memory allocation system to subdivide RAM 22 as desired.

The table created above is then processed in step 304. For example, the sysRamDescTblProcess facility 86 may be used to process the memory configuration table 89. This processing may include sub-step 306, in which are determined the minimum memory requirements for the memory regions specified. If the required amount of memory exceeds the available memory, step 308 sends the process to step 310, where an error message is generated. If the available memory is sufficient, the process continues to step 312. There, if any unallocated memory remains, the size of the regions is increased according to the user-specified growth factors, until all available memory is allocated. In step 314 the starting addresses of each region is computed, following the rules applicable to PCI systems. Then, the BSP-specific visibility and cacheability values are converted to values useable by the operating system of the auxiliary processor in step 316.

In step 318 a determination is made whether there is a request to assign MMU initialization table entry address and size fields. If so, the assignment is carried out in step 320. The process then continues with step 322, in which memory page pools are created for specified regions. As described above, the user may specify when to create the page pools. The process ends with step 324, where the registers of the auxiliary processor 21 are programmed to map memory according to the visibility attributes, the addresses and the sizes of memory regions contained in the processed memory configuration table.

Although the invention was described with reference to specific exemplary embodiments, the memory allocation system described above can be applied with minimal changes to other configurations of host CPU, daughter CPU and peripherals. Accordingly, the above described exemplary embodiments are to be treated as descriptive rather than limiting.

What is claimed is:

1. A memory configuration system for an auxiliary processor having an internal bus and connectable to an external system via at least one external bus, the system comprising:

a memory configuration table including a plurality of entries, each of the plurality of entries corresponding to one of a plurality of regions of auxiliary processor memory and including at least one location field, at least one size field, and at least one visibility field;

a module configured to partition the auxiliary processor memory into the plurality of regions, including assigning values to the at least one location field, at least one size field, and at least one visibility field, wherein the at least one visibility field includes a field indicating visibility of the corresponding region by at least one of the internal bus and the at least one external bus.

2. The system according to claim 1, wherein the module is further configured to receive inputs for memory configuration, and to use the inputs to partition the auxiliary processor memory.

3. The system according to claim 2, wherein the inputs include at least one of size, start address, visibility and cacheability of each of the plurality of regions.

4. The system according to claim 1, wherein each entry of the plurality of entries includes an index field corresponding to an MMU initialization table entry, and wherein the module is further configured to use an index to the memory management unit initialization table entry to describe a cacheability of the corresponding memory region.

5. The system according to claim 1, wherein the field indicating visibility of the corresponding region is a bit map.

6. The system according to claim 1, wherein the module is further configured to enlarge a size of selected regions to completely utilize the auxiliary processor memory.

7. The system according to claim 6, wherein the selected memory regions are enlarged according to a surplus field included in each of the plurality of entries.

8. The system according to claim 1, wherein the module is further configured to create page pools in selected regions.

9. The system according to claim 1, wherein the module is further configured to compute base address and length of a minimal address range of auxiliary processor memory available to each of the internal bus and at least one external bus, based on the memory configuration table.

10. The system according to claim 1, wherein the module is further configured to convert visibility and cacheability values into values compatible with an auxiliary processor operating system.

11. A method of partitioning a memory of an auxiliary processor, comprising:

constructing a memory configuration table configured to contain size and visibility attributes of a plurality of memory regions, the visibility attributes corresponding to accessibility of each of the plurality of memory regions via at least one bus of a plurality of buses;

computing a range of memory addresses accessible over the at least one bus for caching the plurality of memory regions; and setting registers of the auxiliary processor to map memory according to the size, visibility attributes and range of memory addresses for each of the plurality of memory regions.

12. The method according to claim 11, wherein constructing the memory configuration table includes entering specified inputs into the memory configuration table.

13. The method according to claim 12, wherein the specified inputs comprise size, address, visibility and cacheability of each of the plurality of memory regions.

14. The method according to claim 11, further comprising increasing the size attributes of selected memory regions to utilize substantially all the memory of the auxiliary processor.

15. The method according to claim 11, further comprising forming memory page pools in selected memory regions.

16. The method according to claim 11, further comprising utilizing memory management unit initialization table entries to describe cache attributes of the memory regions.

17. The method according to claim 11, further comprising generating a bit map to describe visibility attributes of the memory regions.

18. A computer readable medium having stored thereon instructions adapted to be executed by a processor, wherein the instructions when executed initiate a method for partitioning a memory of an auxiliary processor, comprising:

constructing a memory configuration table adapted to describe size and visibility attributes of a plurality of memory regions, the visibility attributes corresponding to accessibility of each of the plurality of memory regions via at least one bus of a plurality of buses;

computing a range of memory addresses accessible over the at least one bus for each of the plurality of memory regions; and setting registers of the auxiliary processor to map memory according to the size, visibility attributes and range of memory addresses for each of the plurality of memory regions.

* * * * *